March 4, 1930.  P. R. BASSETT  1,749,059
GYROSCOPIC COMPASS
Filed April 5, 1923
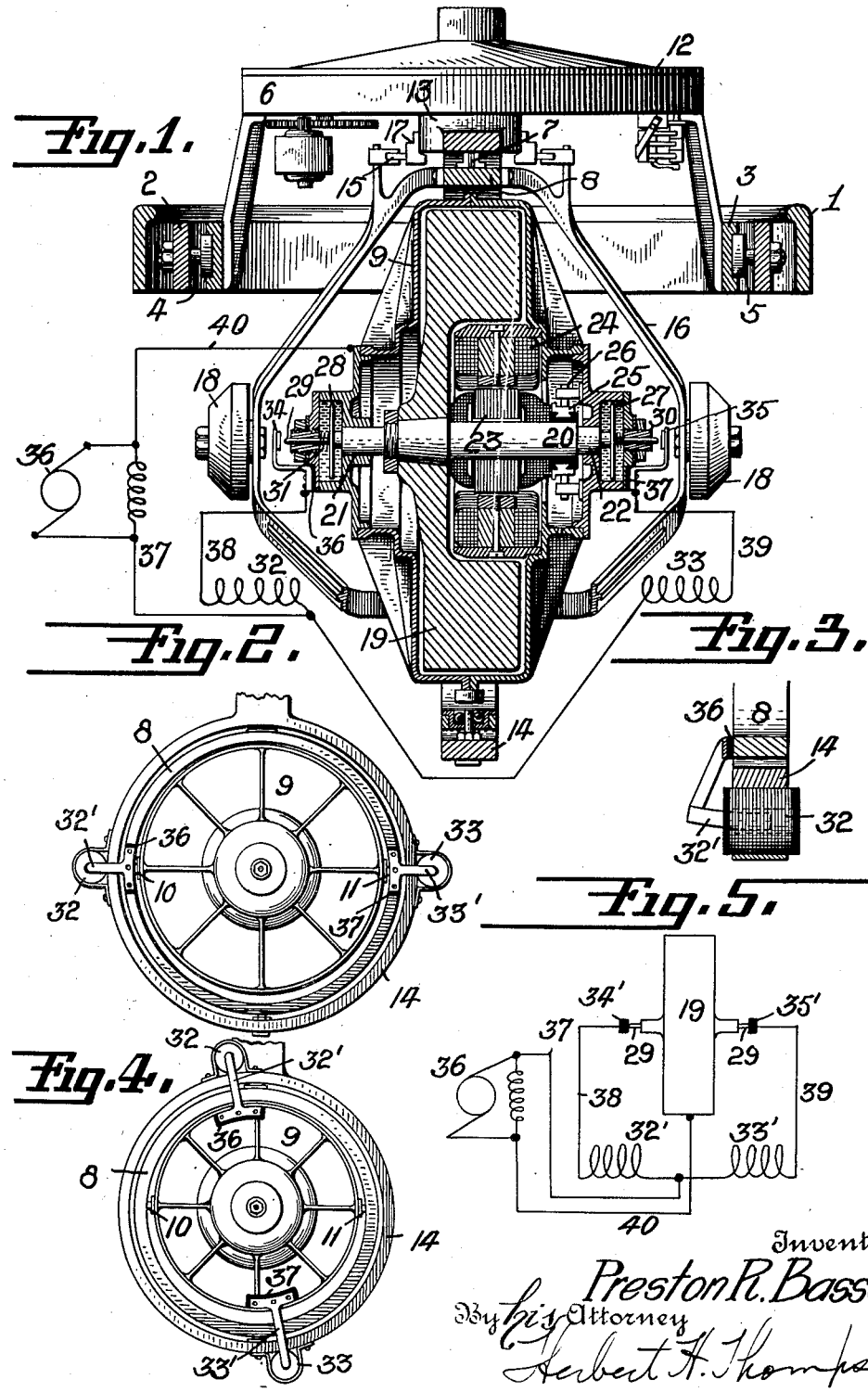
Inventor
Preston R. Bassett.
By his Attorney
Herbert H. Thompson Patented Mar. 4, 1930

1,749,059

UNITED STATES PATENT OFFICE

PRESTON R. BASSETT, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

GYROSCOPIC COMPASS

Application filed April 5, 1923. Serial No. 630,034.

This invention relates to a gyroscopic compass and has for its object the provision of an improved device of this character.

More specifically, my invention has reference to a normally balanced or non-pendulous gyroscopic compass having two horizontal axes or degrees of freedom and a vertical axis. The horizontal axes consist of the rotor or spinning axis and the horizontal bearing or tilting axis. In accordance with well known gyroscopic phenomena, any downward or gravitational force which is a torque around the tilting axis causes precession about the vertical axis causing the gyroscope to turn into the plane of the meridian. According to the present invention I bring into action a gravity or other couple when the compass is off the meridian, by shifting the rotor across the tilting axis, the spinning axis on which the rotor is carried being arranged to allow the rotor to shift axially to a greater or less extent. Since the rotor is rotating at a high speed in a direction at right angles to the shifting movements, a practically frictionless bearing for the shaft is obtained. Therefore, by allowing sufficient end play of the rotor in its casing, the center of gravity may be shifted to any desired extent by the tilting of the gyroscope with respect to the horizontal bearings. Since the weight thus shifted is the entire rotor weight, the distance of shift may be comparatively small. The shift of weight, due to a tilt in such a gyro induced by the earth's rotation when the gyro is off the meridian, will cause the gyro to precess rapidly toward the meridian. Since the rotor will shift to the low side of the gyroscope, the preferred form of compass rotates in the opposite direction to a pendulous compass, so that when viewed from the south end, the rotor revolves counter-clockwise. As is well known to those skilled in the art, continuous oscillations of the gyro would result, unless a damping means were employed. I have therefore provided suitable means for this purpose, which are preferably electro-magnetic and are positioned to create a torque about the gyro vertical axis in such a direction as to decrease the elevation. These magnets may also be controlled by the axial shift of the gyro rotor.

My invention will be better understood from the following description taken in connection with the accompanying drawings, and its scope will be pointed out in the appended claims:

In the drawings, illustrating what I now consider the preferred form of my invention, Fig. 1 is a front elevation, partly sectioned vertically, of a gyro-compass embodying my invention, and a diagram of the electrical connections, Fig. 2 is an elevation of the gyro rotor with supporting rings and damping magnets viewed from its south end, Fig. 3 is an enlarged detail of one of the damping magnets, Fig. 4 is a view similar to Fig. 2 of a modification in which the damping magnets are arranged differently, and Fig. 5 is a diagram of the circuit of the damping magnets shown with carbon block contacts.

Referring to the drawings in which the numeral 1 indicates the binnacle ring, in which is supported on horizontal pivots (not shown), a gimbal ring 2. The latter ring supports the inner ring 3 on pivots 4, 5, which are at right angles to the pivots supporting ring 2. Inner ring 3 has fixed thereto a framework including a ring 6. The latter is formed integral with a central hub (not shown) which supports the sensitive element including the suspension 7, vertical ring 8, and gyro casing 9 mounted on horizontal pivots 10, 11 in said vertical ring 8. A follow-up system from said sensitive element includes the card 12, hub 13, and phantom ring 14. Electrical connections between the sensitive element and the follow-up system are provided by trolley poles 15 carried by a frame 16 mounted on vertical ring 8 and cooperating with pairs of contacts 17 on the follow-up system, each pair being separated by insulating strips. An adjustable compensating weight 18 may be provided at each side of the vertical frame 16. The construction and operation of the parts thus far described are well known in the art and need not be described with greater detail, since they constitute no part of the present invention. Obviously, my invention may be applied to other types of compasses than the one described, this form having been selected for purposes of illustration only.

Within the gyro casing 9, a rotor 19 is on a horizontal shaft 20, known as the spinning axis, journaled in bearings 21, 22 of said casing. The shaft 20 carries a suitable armature 23, which is surrounded by a suitable field 24 carried by the casing 9 in the usual manner. Current may be fed to the motor comprising armature 23 and field 24 through contacts 25 and brushes 26. While I have shown a D. C. motor in the drawings, it is of course understood that any suitable type of A. C. induction motor could be used. Adjacent each of bearings 21, 22, the casing 9 is provided with a chamber 27 into which the shaft 20 extends. As shown in Fig. 1 a clearance is provided on both sides of the rotor 19 and the adjacent walls of the casing 9, so that when the casing 9 is tilted about its horizontal bearings 10, 11, the rotor 19 may shift axially by force of gravity. Due to the rotation of the rotor, which of course is at right angles to the shifting motion, a practically frictionless shaft results since static friction is eliminated. Within each of chambers 27 is a piston 28 which may be secured to the ends of shaft 20 in any suitable manner. These pistons each carry a stem 29 slidable within a sleeve 30 in the outer end wall of the chamber. Helical springs 31 may be interposed between the piston 28 and sleeve 30 for centralizing the rotor. While these springs prevent the rotor from wandering when level, they are too weak to retard the rotor shift when tilted but may be used to cause the amount of shift of the rotor to be proportional to the tilt. The chambers 27 are filled with a suitable oil or other viscous fluid. The pistons 28 act as a dashpot or damper upon shaft 20 and prevent the axial shifting of shaft 20 due to acceleration pressures caused by the roll of the ship. The roll of the ship has a short period and the shifting of shaft 20 is prevented by the slow acting dashpot. On the other hand, the tilt of the rotor axis caused by the earth's rotation acts in one direction long enough to overcome the dashpot damping as do also acceleration pressures due to changes in speed or course of the ship. Consequently, the shifting of the rotor 19 due to horizontal tilting is not affected by said slow acting dashpot.

Assuming that the gyro thus far described is driven in a counter-clockwise direction when viewed from the south, when it is off the meridian, the earth's rotation will cause it to tilt about the horizontal bearings 10, 11, or its tilting axis. This tilting will cause the rotor 19 to shift by force of gravity to the lower end. This shifting of the center of gravity of the rotor with respect to the tilting axis exerts a downward force about the tilting axis which causes precession about the vertical axis. Assuming that this shifting has caused the spinning axis to be deflected towards the east, if undamped, it will swing back under the action of the directive force through the north and south position over to an equal angle on the western side, and will thereafter oscillate back and forth with a constant period, until frictional and other losses cause the motion to die away. Therefore, to damp these oscillations, it is necessary to restore the spinning axis 20 to a horizontal position, in which position, of course, the rotor is in its normal balanced relation, and the oscillations cease. This may be accomplished by applying a torque about the vertical axis in a direction to decrease the tilt. For this purpose I employ two electromagnets 32, 33, which are suitably mounted on the phantom 14 on the horizontal axis as shown in Fig. 2. In this position, of course, the torque is about the vertical axis which would cause the north end of the gyro to seek the meridian. The armatures 32', 33' for said magnets may be secured to the vertical ring 8, or other portion of the sensitive element, in any convenient manner, such for example, as shown in Fig. 3. Adjacent each of the chambers 27 is a contact bearing member 34, 35, which is insulated from the rotor casing by insulating members 36, 37. The contacts 34, 35 are arranged to be engaged by the adjacent stem 29 when the rotor shifts, due to tilting about the horizontal axis. I make use of this shifting motion to control the electromagnets 32, 33. This will be readily understood from Fig. 1, in which a source of direct current is shown at 36. The electromagnets 32, 33 are connected in parallel to one side of said source by a conductor 37, and are respectively connected to contacts 34, 35, by conductors 38, 39. The opposite side of the source 36 is grounded on the casing 9 by a conductor 40. From this, it will be seen that magnet 32 will be energized when the rotor shifts to cause stem 29 and contact 34 to engage, and that magnet 33 will be energized when the rotor shifts in the opposite direction causing the other stem 29 to engage contact 35. In view of the foregoing description, the damping action of magnets 32 and 33 will be apparent to those skilled in the art.

In Fig. 4 is shown a modification of my invention, which is in all respects similar to that described in connection with Figs. 1, 3 and 5, that is, the rotor may shift, or tend to shift axially and the damping magnets are controlled in the same manner, however the magnets 32, 33 are mounted in a different way from that shown in Fig. 2 and the amount of shift of the rotor may be reduced. In that figure, the damping magnets exert a torque about the vertical axis alone. In the modification, the magnets 32, 33 are arranged to exert a torque about an inclined axis which has a component about both the vertical and horizontal axes. As above indicated, a torque about the horizontal axis causes the gyro to seek the meridian, the degree being determined by the distance of application from the vertical axis. The torque about the horizontal axis, on the other hand, will impart more or less directive power to the compass, by adding to or overcoming the gravitational torque caused by the shifting of the rotor. For this purpose, coils 32, 33 may be mounted on the phantom 14 on any axis other than the vertical and horizontal axis. However, the armatures 32', 33', instead of being secured to the vertical ring as in Fig. 2, are secured to the rotor casing 9, in order to exert the combined torque about the vertical and horizontal axes. Therefore, by this arrangement, it is possible to limit the shifting of the rotor to a small amount, merely great enough to operate the contacts 34, 35, dependence being chiefly or entirely placed on the magnetic means for directive power.

To this end, if desired, I may make contacts 34' and 35' in the form of carbon blocks, (Fig. 5) against both of which contacts 29 continually bear. Magnets 32' and 33' are then continuously excited, but since they oppose one another in operation, as long as they are of equal strength, no torque will be exerted. When the compass becomes inclined, however, the rotor will exert a greater pressure on the block on the low side (34, for instance) but the amount of shift, will be microscopic, and therefore, the compass will remain substantially balanced. This will increase the strength of coil 32 over coil 33 and exert a torque on the compass to impart thereto directive and damping properties. Since the resistance of the carbon blocks 34'—35' is reduced in proportion to the pressure exerted thereon, it follows that the resulting torque on the compass, applied by the solenoids 32—33, is substantially proportional to the tilt. Obviously such a compass may be rotated in either direction, dependent on the hook-up between the contacts and magnets. Such a compass further possesses the important advantage that it is non-pendulous under all conditions.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is, 1. In a gyroscopic compass, a rotor, means for mounting the same for spinning about a normally horizontal axis including rotor bearings permitting said rotor to shift its position axially in response to changes in the resultant direction of the forces acting thereon whereby meridian seeking properties are imparted thereto.

2. In a gyroscopic compass, the combination of a rotor, means for mounting the same on a horizontal spinning axis, means for supporting said mounting means on a horizontal axis at an angle to said spinning axis. said means permitting the rotor to shift axially in response to changes in its inclination, and means for preventing such shift due to acceleration forces of short duration.

3. In a gyroscopic compass, a rotor mounted on a horizontal axis having a spinning axis journaled in horizontal bearings at right angles to said axis, said rotor being arranged to slide axially within said bearings when tilted about said horizontal axis, a chamber adjacent at least one of said bearings containing a viscous fluid, and a piston adjacent the end of the spinning axis within said chamber to be moved longitudinally of said chamber on axial movement of said spinning axis for the purpose specified.

4. In a gyroscopic compass the combination of a rotor, means for mounting the same for tilting about a horizontal axis, an axially slidable horizontal spinning axis for said rotor whereby the rotor may shift its position at right angles to said axis of tilt when tilted about said tilt axis, and means controlled by the shifting of said rotor for damping the compass.

5. In a gyroscopic compass, a rotor, means for mounting the same for tilting about a horizontal axis, bearings for said rotor mounting the same for spinning about an axis at an angle to said tilt axis and permitting said rotor to shift its position with respect to said tilt axis in response to changes in its inclination and electromagnetic means controlled by said shifting of the rotor for reducing the tilt of the rotor.

6. In a gyroscopic compass, a rotor casing pivoted on a horizontal axis, a rotor journaled in said casing at right angles to said axis, electrical contacts at each end of the rotor axis, and contacts on said casing adjacent said first mentioned contacts, said rotor being arranged to shift axially when the casing tilts about its axis, thereby causing the contact at one end of its axis to engage the adjacent casing contact, and torque applying means adapted to be brought into action by said contacts.

7. In a gyroscopic compass, the combination with the rotor bearing frame, means for mounting the same in a balanced condition for oscillation about a horizontal axis, of a rotor, bearing means journaling said rotor for spinning about an axis at an angle to said horizontal axis and permitting limited axial shift thereof, and means brought into action by axial shift of the rotor for exerting a torque on the frame.

8. In a gyroscopic compass, the combination with the rotor bearing frame, means for mounting the same in a balanced condition for oscillation about a horizontal axis, of a rotor, bearing means journalling said rotor for spining about an axis at an angle to said horizontal axis and permitting limited axial shift thereof, electrical contact means adapted to be shifted by axial shift of the rotor, and means controlled by said contact means for exerting a torque on the frame about a horizontal axis for imparting directive power thereto.

9. A gyroscopic compass as claimed in claim 8 wherein the end shift of the rotor is microscopic whereby the frame remains substantially balanced under all conditions.

10. In a gyroscopic compass, the combination with the rotor bearing frame, means for mounting the same in a balanced condition for oscillation about a horizontal axis, of a rotor journaled therein for spinning about an axis at an angle to said horizontal axis, variable means for exerting a torque on said frame in each of opposite directions, and means controlled by the end pressure exerted by the rotor shift on change in the inclination thereof for varying the relative torques exerted by said two means.

11. In a gyroscopic compass, the combination with the sensitive element and follow-up element, of electro-magnetic means acting between said elements for exerting torques on the sensitive element to impart directive power thereto and gravitational means responsive to tilt of said sensitive element and independent of said other element for controlling said magentic means.

12. In a gyroscopic compass, a rotor bearing casing, means for mounting the same for turning about a vertical axis and for tilting about a horizontal axis, a rotor mounted in said casing on a normally horizontal spinning axis at an angle to said tilt axis, said rotor being longitudinally movable along said spinning axis, and electro-magnetic means controlled by the longitudinal shifting of said rotor for damping the oscillations of the compass.

13. In a gyroscopic compass, the combination with the rotor bearing frame, means for mounting the same in a balanced condition for oscillation about a horizontal axis, of a rotor journaled therein for spinning about an axis at an angle to said horizontal axis, variable means for exerting a torque on said frame in each of opposite directions, and means controlled by the end pressure exerted by the rotor shift on change in the inclination thereof for varying the relative torques exerted by said two means in accordance with the direction and magnitude of the tilt of said frame about said first-named axis.

14. In a gyroscopic compass, the combination with the sensitive element including the rotor, and a follow-up element, of electro-magnetic means acting between said elements for exerting torques on the sensitive element to impart directive power thereto, and a pressure sensitive means on said sensitive element at an end of the rotor axle, and adapted to receive the end thrust of the rotor upon inclination of the rotor axle, said means being in circuit with said first-named means for controlling the same.

15. In a gyroscopic compass, the combination with the rotor bearing frame, means for mounting the same in a balanced condition for oscillation about a horizontal axis, of a rotor journaled therein for spinning about an axis at an angle to said horizontal axis, variable means for exerting a torque on said frame in each of opposite directions, pressure sensitive means for centralizing said rotor in said frame, and an electrical circuit between said pressure means and torque means whereby the latter exerts a torque on the gyroscope proportional to the tilt.

In testimony whereof I have affixed my signature.

PRESTON R. BASSETT.